US008982705B2

(12) United States Patent
Watanabe

(10) Patent No.: US 8,982,705 B2
(45) Date of Patent: Mar. 17, 2015

(54) TRANSMISSION CONTROL APPARATUS AND TRANSMISSION CONTROL METHOD

(75) Inventor: Koichiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 213 days.

(21) Appl. No.: 13/064,789

(22) Filed: Apr. 15, 2011

(65) Prior Publication Data

US 2011/0299398 A1    Dec. 8, 2011

(30) Foreign Application Priority Data

Jun. 8, 2010  (JP) ................................ 2010-131340

(51) Int. Cl.
H04L 12/26    (2006.01)
H04L 29/08    (2006.01)
H04B 7/155    (2006.01)

(52) U.S. Cl.
CPC ............ H04L 67/1095 (2013.01); H04B 7/155 (2013.01)
USPC ...................... 370/236; 370/236.1; 370/236.2; 370/237; 370/238

(58) Field of Classification Search
CPC ....................................................... H04B 7/155
USPC ..................... 370/236, 236.1, 236.2, 237, 238
See application file for complete search history.

(56) References Cited

U.S. PATENT DOCUMENTS

| | | | | | |
|---|---|---|---|---|---|
| 4,999,833 | A | * | 3/1991 | Lee | 370/312 |
| 6,226,673 | B1 | * | 5/2001 | Yoshimoto | 709/223 |
| 6,272,353 | B1 | * | 8/2001 | Dicker et al. | 455/517 |
| 6,772,219 | B1 | * | 8/2004 | Shobatake | 709/238 |
| 6,785,510 | B2 | * | 8/2004 | Larsen | 455/11.1 |
| 6,868,083 | B2 | * | 3/2005 | Apostolopoulos et al. | 370/392 |
| 6,950,431 | B1 | * | 9/2005 | Nozaki et al. | 370/390 |

(Continued)

FOREIGN PATENT DOCUMENTS

| | | |
|---|---|---|
| JP | 2005-322033 A | 11/2005 |
| JP | 2008-159193 | 7/2008 |
| JP | 2008-160581 | 7/2008 |

OTHER PUBLICATIONS

Japanese Office Action issued Sep. 24, 2014 for corresponding Japanese Application No. 2010-131340.

(Continued)

*Primary Examiner* — Andrew Lai
*Assistant Examiner* — Andrew C Lee
(74) *Attorney, Agent, or Firm* — Rader, Fishman & Grauer PLLC

(57) ABSTRACT

A transmission control apparatus includes: a communication unit communicating with each of communication apparatuses, which are included in a communication system in which communication is executed via one relay apparatus, via the relay apparatus; a determination unit determining, as a transmission apparatus transmitting content data indicating a content to be transmitted, the apparatus with higher transmission quality between the apparatus and the relay apparatus in the communication system based on quality information of each communication apparatus, which is received by the communication unit and includes information regarding the transmission quality between the relay apparatus and the communication apparatus; and a transmission control unit allowing the transmission apparatus determined by the determination unit to concurrently transmit the content data indicating the content to the respective apparatuses of the communication system excluding the transmission apparatus.

15 Claims, 8 Drawing Sheets

(56) References Cited

U.S. PATENT DOCUMENTS

| | | | |
|---|---|---|---|
| 6,952,422 B2 * | 10/2005 | Yamaguchi | 370/401 |
| 6,993,584 B2 * | 1/2006 | Border et al. | 709/227 |
| 7,177,295 B1 * | 2/2007 | Sholander et al. | 370/338 |
| 7,269,147 B2 * | 9/2007 | Kim et al. | 370/312 |
| 7,385,930 B2 * | 6/2008 | Yasuie et al. | 370/244 |
| 7,394,776 B2 * | 7/2008 | Lee et al. | 370/310 |
| 7,440,761 B2 * | 10/2008 | Matsukura et al. | 455/452.2 |
| 7,574,522 B2 * | 8/2009 | Oguchi | 709/238 |
| 7,574,523 B2 * | 8/2009 | Traversat et al. | 709/238 |
| 7,577,124 B2 * | 8/2009 | Yomo et al. | 370/338 |
| 7,606,182 B2 * | 10/2009 | Park et al. | 370/279 |
| 7,627,748 B2 * | 12/2009 | Saito et al. | 713/153 |
| 7,633,945 B1 * | 12/2009 | Sakoda et al. | 370/395.4 |
| 7,643,427 B2 * | 1/2010 | Kokku et al. | 370/238 |
| 7,702,280 B2 * | 4/2010 | Takeda et al. | 455/7 |
| 7,760,702 B2 * | 7/2010 | Deng et al. | 370/351 |
| 7,813,302 B2 * | 10/2010 | Senta et al. | 370/255 |
| 7,852,764 B2 * | 12/2010 | Yamaguchi et al. | 370/231 |
| 7,907,540 B2 * | 3/2011 | Li et al. | 370/252 |
| 7,920,573 B2 * | 4/2011 | Suetsugu et al. | 370/395.42 |
| 7,933,236 B2 * | 4/2011 | Wang et al. | 370/328 |
| 7,940,728 B2 * | 5/2011 | Horiuchi et al. | 370/335 |
| 7,944,871 B2 * | 5/2011 | Imamura et al. | 370/315 |
| 7,978,698 B2 * | 7/2011 | Yamaguchi et al. | 370/390 |
| 8,010,041 B2 * | 8/2011 | Wang et al. | 455/7 |
| 8,018,889 B2 * | 9/2011 | Lim et al. | 370/315 |
| 8,018,893 B2 * | 9/2011 | Sartori et al. | 370/329 |
| 8,023,426 B2 * | 9/2011 | Liu et al. | 370/252 |
| 8,040,842 B2 * | 10/2011 | Nakatsugawa | 370/329 |
| 8,144,597 B2 * | 3/2012 | Senarath et al. | 370/238 |
| 8,346,275 B2 * | 1/2013 | Ogura | 455/453 |
| 8,355,402 B2 * | 1/2013 | Chion et al. | 370/395.21 |
| 8,417,255 B2 * | 4/2013 | Dayal et al. | 455/452.2 |
| 8,472,366 B2 * | 6/2013 | Xu et al. | 370/315 |
| 2004/0076154 A1 | 4/2004 | Mizutani et al. | 370/389 |
| 2004/0139224 A1 * | 7/2004 | Nishimura et al. | 709/238 |
| 2004/0213159 A1 * | 10/2004 | Helgesen | 370/238 |
| 2004/0242154 A1 * | 12/2004 | Takeda et al. | 455/16 |
| 2005/0232183 A1 * | 10/2005 | Sartori et al. | 370/319 |
| 2007/0070953 A1 * | 3/2007 | Yoon et al. | 370/334 |
| 2008/0013459 A1 * | 1/2008 | Do et al. | 370/248 |
| 2008/0037457 A1 * | 2/2008 | Matsukura et al. | 370/315 |
| 2008/0045145 A1 * | 2/2008 | Nakatsugawa | 455/11.1 |
| 2008/0076433 A1 * | 3/2008 | Cheng et al. | 455/442 |
| 2008/0080369 A1 * | 4/2008 | Sumioka et al. | 370/229 |
| 2008/0108369 A1 * | 5/2008 | Visotsky et al. | 455/455 |
| 2008/0137585 A1 * | 6/2008 | Loyola et al. | 370/315 |
| 2008/0177822 A1 | 7/2008 | Yoneda | |
| 2008/0214182 A1 * | 9/2008 | Wang et al. | 455/423 |
| 2009/0047898 A1 * | 2/2009 | Imamura et al. | 455/7 |
| 2009/0073916 A1 * | 3/2009 | Zhang et al. | 370/315 |
| 2009/0303895 A1 * | 12/2009 | Zhang et al. | 370/252 |
| 2010/0077274 A1 * | 3/2010 | Kim et al. | 714/750 |
| 2010/0091669 A1 * | 4/2010 | Liu et al. | 370/252 |
| 2010/0098045 A1 * | 4/2010 | Miyazaki | 370/342 |
| 2010/0115079 A1 * | 5/2010 | Sakoda et al. | 709/223 |
| 2010/0177672 A1 * | 7/2010 | Dayal et al. | 370/311 |
| 2010/0185753 A1 * | 7/2010 | Liu et al. | 709/219 |
| 2010/0202322 A1 * | 8/2010 | Cai et al. | 370/254 |
| 2010/0246417 A1 * | 9/2010 | Cheng et al. | 370/252 |
| 2010/0254316 A1 * | 10/2010 | Sendrowicz | 370/328 |
| 2010/0302996 A1 * | 12/2010 | Matsumoto et al. | 370/315 |
| 2010/0322136 A1 * | 12/2010 | Kanazawa et al. | 370/312 |
| 2011/0080864 A1 * | 4/2011 | Cai et al. | 370/315 |
| 2011/0167250 A1 * | 7/2011 | Dicks et al. | 713/2 |
| 2011/0235514 A1 * | 9/2011 | Huang et al. | 370/235 |
| 2011/0271007 A1 * | 11/2011 | Wang et al. | 709/238 |

OTHER PUBLICATIONS

Hasegawa, Daisuke, et al., "Resource Assignment and Relay Tree Construction Scheme Based on Users' Demands of Quality for Real-Time Communication with Multi-User" IEICE Technical Report ISSN 0913-5685, vol. 105 No. 279 Sep. 15, 2005.

* cited by examiner

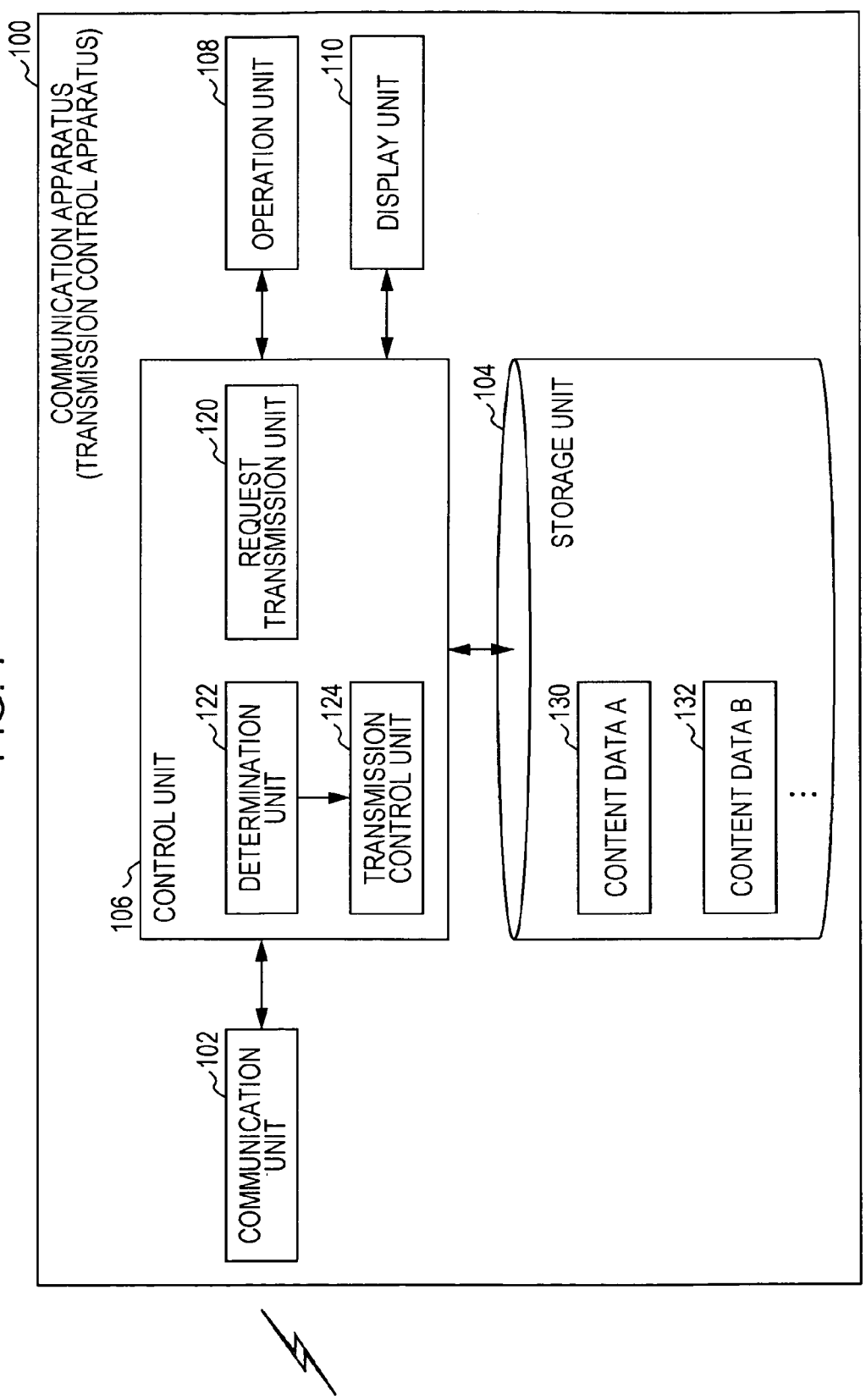

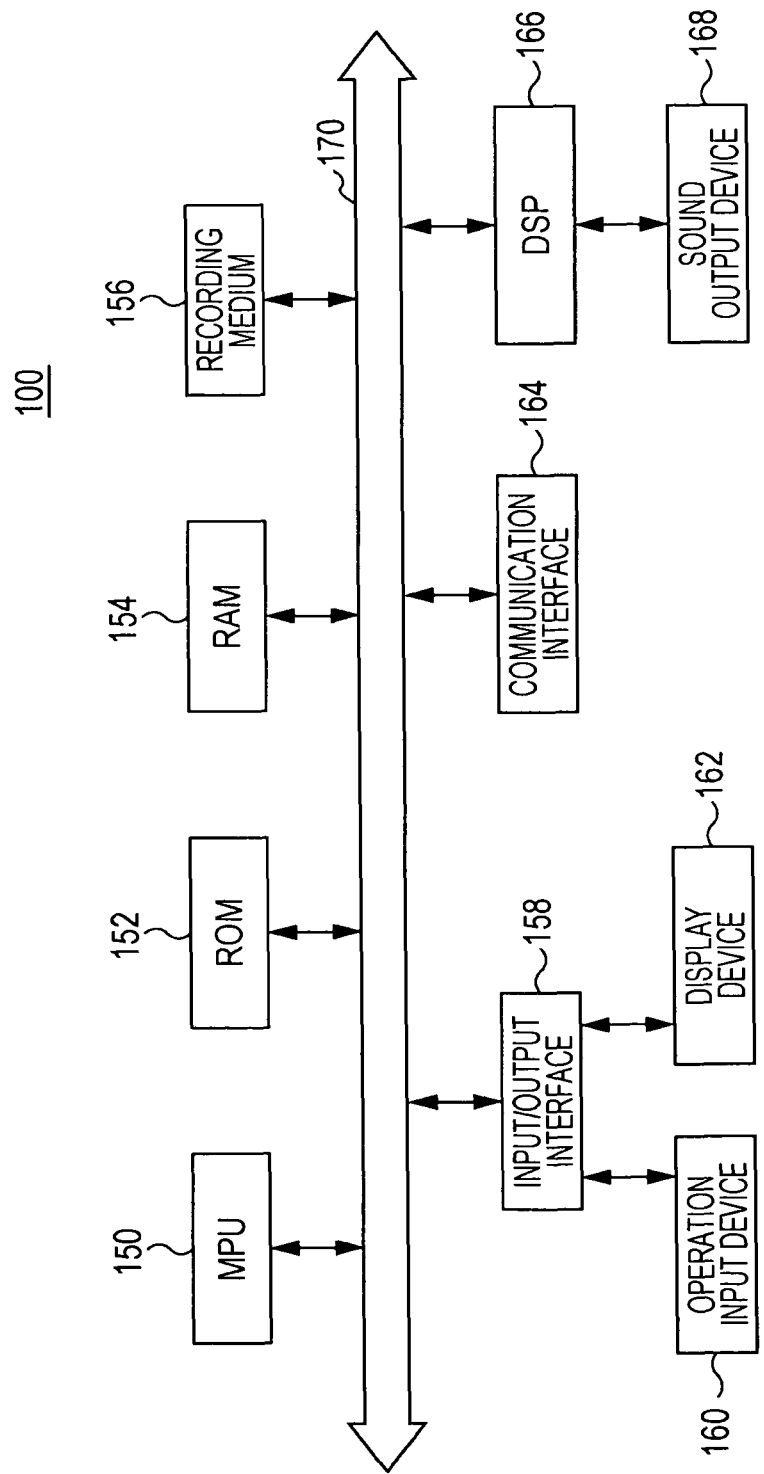

TRANSMISSION CONTROL APPARATUS AND TRANSMISSION CONTROL METHOD

BACKGROUND

The present disclosure relates to a transmission control apparatus and a transmission control method.

In recent years, for example, a communication system has come into widespread use in which content data such as sound data or video data is transmitted or received between apparatuses and the content data transmitted or received between the apparatuses is reproduced. Examples of the communication system include a multi-channel audio system (surround sound system) and a system conforming to the DLNA (Digital Living Network Alliance) standard.

Accordingly, a technique has been developed which controls reproduction of the content data in the communication system. For example, Japanese Unexamined Patent Application Publication No. 2008-159193 discloses a technique for changing over a master apparatus and a slave apparatus in response to an input operation regarding reproduction control.

SUMMARY

According to the technique (hereinafter, also referred to as the "related technique") of the related art capable of controlling reproduction of the content data in the communication system, the roles (master and slave) of apparatuses of the communication system are changed over by executing communication between the apparatuses via a relay apparatus. Moreover, in the communication system (hereinafter, also referred to as the "related communication system") using the related technique, reproduction of the content data, which is stored in a server, in each apparatus is controlled by a master apparatus which controls reproduction of other apparatuses. Accordingly, in the communication system in which the master apparatus controls the reproduction of the content data, which is stored in the server, in each apparatus, the master apparatus and the slave apparatus can easily be changed over in response to the input operation regarding the reproduction control by using the related technique.

For example, the communication system in which content data is transmitted or received between apparatuses and the content data transmitted or received between the apparatuses is reproduced is not limited to a system in which each apparatus receives content data from a server and reproduces the content data, as in the related communication system. As the communication system, a system is exemplified in which a transmission apparatus transmitting content data concurrently transmits the same content data (or transmission data including the content data) to at least one reception apparatus, and the respective reception apparatuses or the transmission apparatus and the respective reception apparatuses synchronize with each other to reproduce the content data.

For example, users in a house can enjoy the same music (which is an example of contents) output from an apparatus (which is the transmission apparatus or is an example of the reception apparatus), which is capable of reproducing a plurality of content data in the house, by synchronizing the respective reception apparatuses or the transmission apparatus and the respective reception apparatuses with each other and reproducing the content data indicating the same content, as described above. However, when the communication system in which the transmission apparatus concurrently transmits the same content data to at least one reception apparatus is, for example, a system (which is a system in which respective apparatuses are connected in a star form) in which respective apparatuses communicate with each other via one relay apparatus, as in the related communication system, the transmission quality of the content data in the entire communication system depends on transmission quality between the transmission apparatus and the relay apparatus. Therefore, for example, when the transmission quality between the transmission apparatus and the relay apparatus is not sufficient to concurrently transmit the same content data to the plurality of reception apparatuses, there is concern that the transmission quality of the content data may deteriorate in the entire communication system.

According to the related technique, the master apparatus and the slave apparatus can be changed over in response to the input operation regarding the reproduction control. However, there is no consideration of the transmission quality between the transmission apparatus (corresponding to the server according to the related technique) and the relay apparatus. Therefore, even when the related technique is used for a communication system in which the transmission apparatus transmits the same content data to at least one reception apparatus, there is a concern that the transmission quality of the content data may deteriorate in the entire communication system.

Accordingly, it is desirable to provide a novel and improved transmission control apparatus and a novel and improved transmission control method capable of preventing deterioration in the transmission quality of content data in the entire communication system in which communication is executed via one relay apparatus.

According to an embodiment of the present disclosure, there is provided a transmission control apparatus including: a communication unit communicating with each of communication apparatuses, which are included in a communication system in which communication is executed via one relay apparatus, via the relay apparatus; a determination unit determining, as a transmission apparatus transmitting content data indicating a content to be transmitted, the apparatus with higher transmission quality between the apparatus and the relay apparatus in the communication system based on quality information of each communication apparatus, which is received by the communication unit and includes information regarding the transmission quality between the relay apparatus and the communication apparatus; and a transmission control unit allowing the transmission apparatus determined by the determination unit to concurrently transmit the content data indicating the content to the respective apparatuses of the communication system excluding the transmission apparatus.

Accordingly, in the communication system in which the communication is executed via one relay apparatus, it is possible to prevent the deterioration in the transmission quality of the content data in the entire communication system.

The determination unit may determine the transmission apparatus based on information regarding transmission quality between the own apparatus and the relay apparatus.

The transmission control apparatus may further include a request transmission unit transmitting a first quality information transmission request for transmitting the quality information to each of the communication apparatuses of the communication system, when the content data indicating the content to be transmitted is stored. The determination unit may determine the transmission apparatus based on the quality information received by the communication unit and selectively transmitted from the communication apparatuses in response to the first quality information transmission request.

When the content data indicating the content to be transmitted is stored, the request transmission unit may transmit a second quality information transmission request for transmitting quality information further including information indicating reproduction quality of the stored content data. When the request transmission unit transmits the second quality information transmission request, the determination unit may determine the apparatus with the higher reproduction quality as the transmission apparatus based on the quality information received by the communication unit and selectively transmitted from the communication apparatuses in response to the second quality information transmission request.

The transmission control apparatus may further include a storage unit storing the content data. The determination unit may determine the transmission apparatus based on the information regarding the transmission quality between the own apparatus and the relay apparatus and information indicating reproduction quality of the content data stored in the memory.

According to another embodiment of the present disclosure, there is provided a transmission control method including; communicating with each of communication apparatuses, which are included in a communication system in which communication is executed via one relay apparatus, via the relay apparatus and acquiring quality information of each communication apparatus, which includes information regarding transmission quality between the relay apparatus and the communication apparatus, from each of the communication apparatuses; determining, as a transmission apparatus transmitting content data indicating a content to be transmitted, the apparatus with higher transmission quality between the apparatus and the relay apparatus in the communication system based on the quality information of each communication apparatus acquired in the acquiring of the quality information; and allowing the transmission apparatus determined in the determining of the transmission apparatus to concurrently transmit the content data indicating the content to the respective apparatuses of the communication system excluding the transmission apparatus.

In the communication system in which the communication is executed via one relay apparatus, it is possible to prevent the deterioration in the transmission quality of the content data in the entire communication system by using the transmission control method.

According to the embodiments of the disclosure, in the communication system executing the communication via one relay apparatus, it is possible to prevent the deterioration in the transmission quality of the content data in the entire communication system.

BRIEF DESCRIPTION OF THE DRAWINGS

FIG. 7 is a block diagram illustrating an example of the configuration of the transmission control apparatus according to the embodiment of the disclosure.

FIG. 8 is a block diagram illustrating an example of the hardware configuration of the transmission control apparatus according to the embodiment of the disclosure.

DESCRIPTION OF THE PREFERRED EMBODIMENTS

Figure 1:
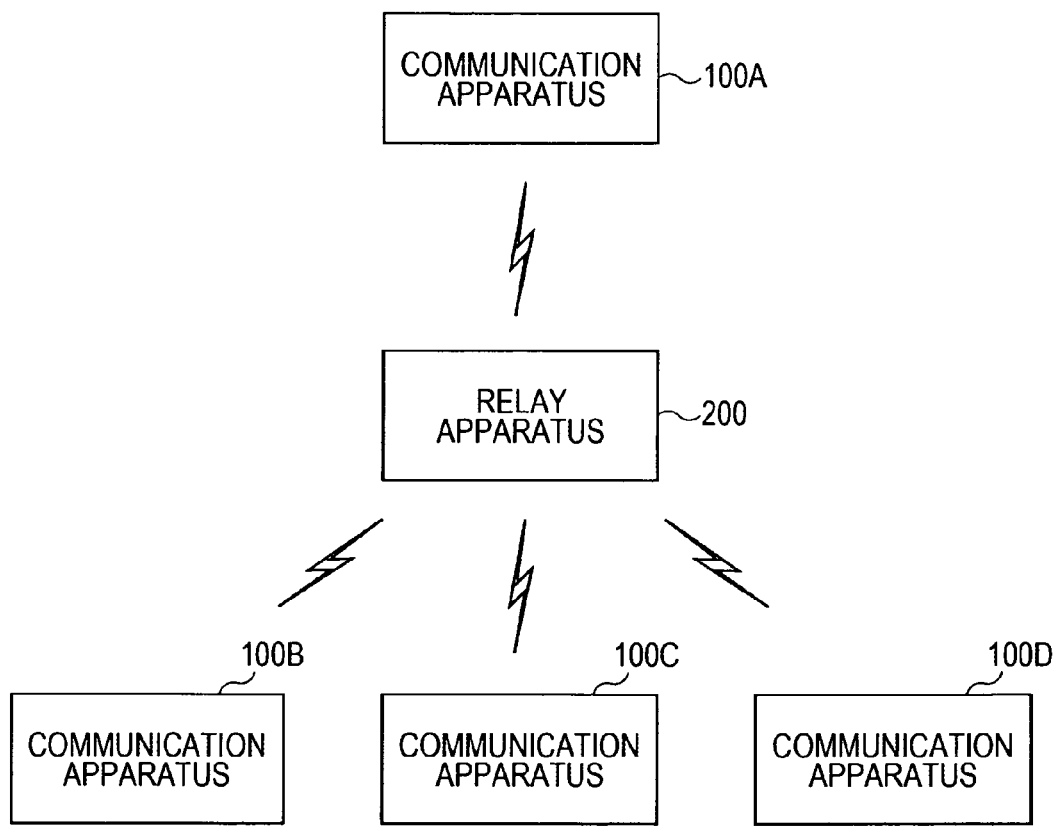
FIG. 1 is a diagram illustrating an example of the configuration of a communication system according to an embodiment of the disclosure.

Hereinafter, preferred embodiments of the disclosure will be described with reference to the accompanying drawings. The same reference numerals are given to constituent elements having substantially the same function in the specification and the drawings and the description thereof will not be repeated.

The description will be made below in the following order.
1. Approach according to Embodiment of Disclosure
2. Transmission Control Apparatus according to Embodiment of Disclosure
3. Program according to Embodiment of Disclosure Approach According to Embodiment of Disclosure An approach to deterioration prevention of the transmission quality of content data according to the embodiment of the disclosure will be described before describing the configuration of a transmission control apparatus according to the embodiment of the disclosure in a communication system (hereinafter, also referred to as a "communication system 1000") according to the embodiment of the disclosure. Here, the content data according to the embodiment of the disclosure refers to data, such as sound data indicating sound (including music and hereinafter, the same is applied below) or video data indicating sound and an image (still image/moving image) indicating a content such as sound or an image.

Overview of Communication System 1000

The overview of the communication system 1000 will be described before describing the overview of the approach to the deterioration prevention of the transmission quality of the content data according to the embodiment of the disclosure. FIG. 1 is a diagram illustrating an example of the configuration of the communication system 1000 according to the embodiment of the disclosure.

The communication system 1000 includes communication apparatuses 100A, 100B, 100C, and 100D (hereinafter, also collectively referred to as the "communication apparatuses 100") and a relay apparatus 200. A star-type network is configured with reference to the relay apparatus 200.

The communication apparatus 100 concurrently transmits the content data to the other communication apparatuses 100 of the communication system 1000 via the relay apparatus 200. Here, for example, the concurrent transmission of the content data according to the embodiment of the disclosure refers to the fact that the communication apparatus 100 "concurrently transmits" the content data to each communication apparatus 100 to which the content data is scheduled to be transmitted or "synchronizes with each communication apparatus and transmits" the content data to each communication apparatus 100. Examples of the content data transmitted by the communication apparatus 100 include content data stored in a storage unit (described below) and content data received by a communication unit (described below) and transmitted from an external apparatus.

The communication apparatus 100 receives the content data transmitted from an external apparatus via the relay apparatus 200. That is, in the communication system 1000, the communication apparatus 100 has a role of a transmission apparatus transmitting the content data or a reception apparatus receiving the content data transmitted from an external apparatus which has a role of a transmission apparatus.

Moreover, for example, the communication apparatus 100 may have a function of performing processing associated with the approach to the deterioration prevention of the transmission quality described below, based on an operation signal formed in response to a predetermined user operation delivered from an operation unit (described below) or an external operation signal formed in response to a user operation transmitted from an external operation apparatus (not shown) such as a remote controller. The communication apparatus 100 performing the approach to the deterioration prevention of the transmission quality described below has a role of a transmission control apparatus controlling transmission of the content data in the communication system 1000.

For example, the communication system 1000 according to the embodiment of the disclosure may include a transmission control apparatus separate from the communication apparatus 100 or the relay apparatus 200 may have a role of the transmission control apparatus. Hereinafter, a case will be mainly described in which the communication apparatus 100 has the role of the transmission control apparatus.

The relay apparatus 200 has a role of relaying the communication between the respective communication apparatuses 100 of the communication system 1000.

Figure 2:
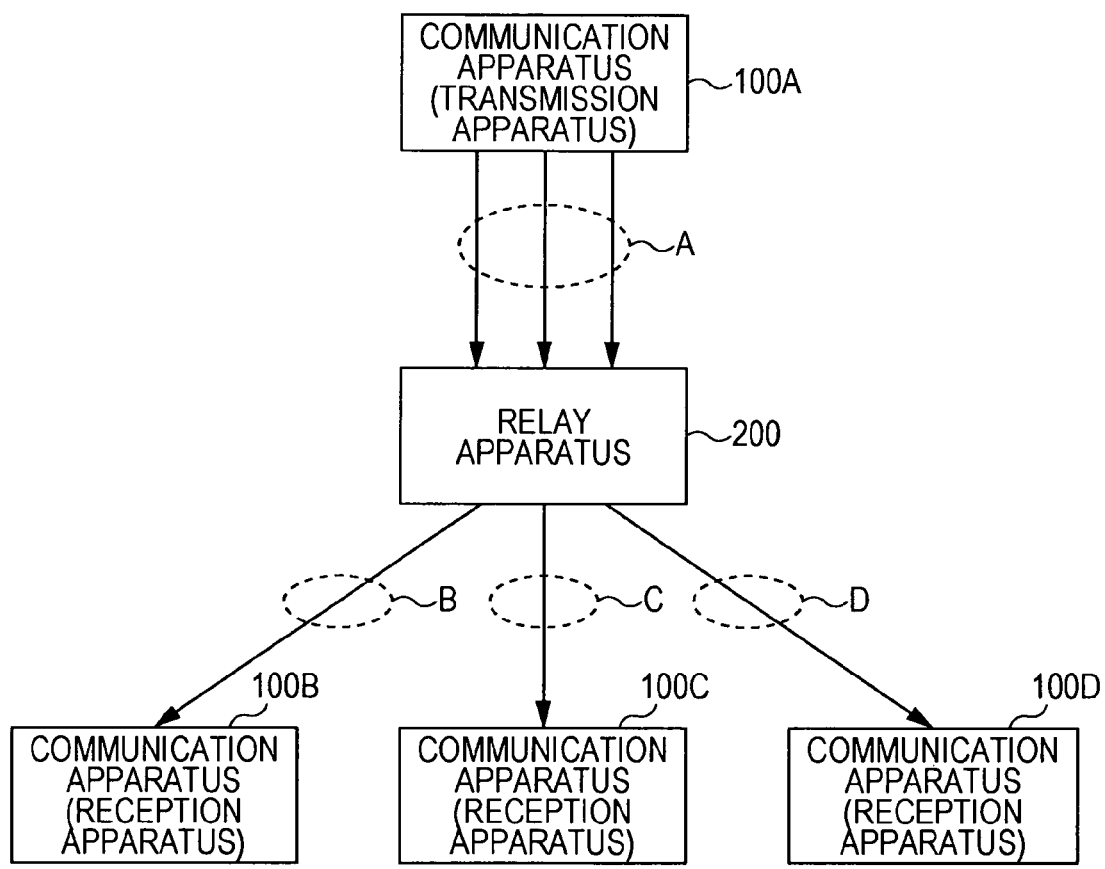
FIG. 2 is a diagram illustrating the overview of an approach to deterioration prevention of the transmission quality of content data according to the embodiment of the disclosure.

In FIG. 1, the communication system 1000 is configured to include four communication apparatuses 100. However, the communication system 1000 according to the embodiment of the disclosure is not limited to the configuration in which four communication apparatuses 100 are included. For example, the communication system 1000 according to the embodiment of the disclosure may be configured to include two, three, or five or more, or the like, that is, a plurality of the communication apparatuses 100. In FIG. 2, the relay apparatus 200 and the communication apparatuses 100 are configured to execute wireless communication. However, the relay apparatus 200 and the communication apparatuses 100 may be configured to execute wired communication. The communications system 1000 according to the embodiment of the disclosure includes a data storage apparatus (not shown) storing the content data. In the communication system 1000, the transmission apparatus may acquire the content data stored in the data storage apparatus (not shown) and may concurrently transmit the content data.

Overview of Approach to Deterioration Prevention of Transmission Quality

Next, the overview of the approach to the deterioration prevention of the transmission quality of the content data will be described according to the embodiment of the disclosure. FIG. 2 is a diagram illustrating the overview of the approach to the deterioration prevention of the transmission quality of the content data according to the embodiment of the disclosure. In FIG. 2, the communication system 1000 shown in FIG. 1 is shown. The communication apparatus 100A has the role of a transmission apparatus and the communication apparatuses 100B, 100C, and 100D have the role of a reception apparatus.

When the transmission apparatus concurrently transmits the content data to the respective reception apparatuses, the transmission rate of a communication path (indicated by A in FIG. 2) between the transmission apparatus and the relay apparatus 200 is higher than the transmission rates of communication paths (indicated by B to D in FIG. 2) between the relay apparatus 200 and each reception apparatus. That is, in the communication system 1000, the possibility that the transmission quality of the communication path between the transmission apparatus and the relay apparatus 200 is not sufficient to concurrently transmit the content data is higher than the possibility that the transmission quality of the communication path between the relay apparatus 200 and each reception apparatus is not sufficient to transmit the content data. Therefore, the transmission quality of the content data in the entire communication system 1000 can be known by the transmission quality of the communication path between the transmission apparatus and the relay apparatus 200.

Here, the transmission quality of the communication path between the communication apparatus 100 (transmission apparatus/reception apparatus) and the relay apparatus 200 according to the embodiment of the disclosure is an index used to evaluate the communication path. The transmission quality of the communication path between the communication apparatus 100 and the relay apparatus 200 according to the embodiment of the disclosure is quantitatively measured by, for example, a transmission speed or the number of data retransmission requests in the communication between the communication apparatus 100 and the relay apparatus 200. Moreover, the method of measuring the transmission quality of the communication path between the communication apparatus 100 and the relay apparatus 200 according to the embodiment of the disclosure is not limited to the method of measuring the transmission quality by the transmission speed or the number of data retransmission requests.

The transmission quality of the content data in the entire communication system 1000 according to the embodiment of the disclosure is, for example, an index indicating that the content data concurrently transmitted from the transmission apparatus is normally transmitted to the respective reception apparatuses. For example, the transmission quality of the content data in the entire communication system 1000 according to the embodiment of the disclosure can be expressed by a transmission error ratio.

As described above, the transmission quality of the content data in the entire communication system 1000 depends on the transmission quality of the communication path between the transmission apparatus and the relay apparatus 200. Therefore, when the transmission quality of the communication path between the transmission apparatus and the relay apparatus 200 is not sufficient to concurrently transmit the content data, the transmission quality of the content data in the entire communication system 1000 may deteriorate. In the related art, as described above, the transmission quality of the communication path between the transmission apparatus and the relay apparatus is not taken into consideration. Accordingly, even when the related art is used, there is concern that the transmission quality of the content data in the entire communication system may deteriorate.

In the embodiment of the disclosure, (in principle) an apparatus having transmission quality higher than the transmission quality of the communication path with the relay apparatus 200 is determined as the transmission apparatus. In the embodiment of the disclosure, the content data is concurrently transmitted to the apparatus determined as the transmission apparatus. Moreover, in the embodiment of the disclosure, based on the transmission quality of the communication path with the relay apparatus 200 and reproduction quality of the content data to be transmitted, an apparatus capable of transmitting the content data with higher reproduction quality can be determined as the transmission apparatus among apparatuses with the transmission quality equal to or higher than given transmission quality. The degree of the reproduction quality of the content data according to the embodiment of the disclosure is determined by, for example, a codec, a bit rate, or resolution of the content data.

When the transmission apparatus is determined in this manner in the communication system 1000, the communication apparatus 100 (or the communication apparatus 100 with the transmission quality equal to or higher than the given transmission quality), which has the higher transmission quality of the communication path with the relay apparatus 200 and thus serves as the transmission apparatus, concurrently transmits the content data. Therefore, in the communication system 1000, it is possible to reduce the possibility that the transmission quality of the communication path between the transmission apparatus and the relay apparatus 200 is not sufficient to concurrently transmit the content data. In this embodiment of the disclosure, it is possible to realize the communication system capable of preventing the deterioration in the transmission quality of the content data in the entire communication system by determining the transmission apparatus in the above-described manner.

More specifically, in the communication system 1000, it is possible to prevent the deterioration in the transmission quality of the content data in the entire communication system, for example, by determining the transmission control apparatus through a process (0) described below and performing processes (1) to (3) described below by the transmission control apparatus.

(0) Process of Determining Transmission Control Apparatus

In the communication system 1000 according to the embodiment of the disclosure, not only one apparatus may have the functions (for example, functions of performing the processes (1) to (3) described below) of the transmission control apparatus, but also a plurality of apparatuses may have the functions of the transmission control apparatus. In the communication system 1000, for example, an apparatus detecting the operation signal (or the external operation signal and the same is applied below) based on a predetermined user operation serves as the transmission control apparatus among the apparatuses having the functions of the transmission control apparatus and performs the processes (1) to (3) described below. Here, an example of the predetermined user operation according to the embodiment of the disclosure includes an operation of giving an instruction to select and concurrently transmit the content data using the operation unit (described below) or an external operation apparatus by a user.

The method of determining the transmission control apparatus in the communication system 1000 according to the embodiment of the disclosure is not limited thereto. For example, in the communication system 1000, the transmission control apparatus may be determined when one of the apparatuses having the functions of the transmission control apparatus starts the processes (1) to (3) described below based on process start information. Here, the process start information according to the embodiment of the disclosure refers to, for example, data in which information (for example, information indicating the content data to be a transmission candidate) indicating a content to be transmitted is preset and information regarding the start time of a process associated with the transmission is preset.

In the communication system 1000, it is possible to prevent the deterioration in the transmission quality of the content data in the entire communication system by performing the processes (1) to (3) described below by the transmission control apparatus determined, for example, in the above-described manner and controlling the transmission of the content data in the communication system 1000.

(1) Process of Acquiring Quality Information

The transmission control apparatus communicates with the communication apparatuses 100 (which is the communication apparatus 100 other than own apparatus when the transmission control apparatus is the communication apparatus 100, and the same is applied below) of the communication system 1000 via the relay apparatus 200 and acquires quality information from the communication apparatus 100.

Here, the quality information according to the embodiment of the disclosure refers to information (data) including the information regarding the transmission quality between the relay apparatus 200 and the communication apparatus 100. Examples of the transmission quality included in the quality information include a transmission speed of the communication path between the relay apparatus 200 and the communication apparatus 100 and the number of data retransmission requests.

The information included in the quality information is not limited to the information of the information regarding the transmission quality. For example, the quality information according to the embodiment of the disclosure may further include information indicating the reproduction quality of the content data indicating the content to be transmitted, which is stored in the communication apparatus 100. Here, the content to be transmitted according to the embodiment of the disclosure refers to, for example, a content indicated by the content data which becomes a transmission candidate indicated by the operation signal which is based on a predetermined user operation. An example of the information indicating the reproduction quality according to the embodiment of the disclosure includes information indicating a codec, a bit rate, or resolution (for example, when the content data is video data) of the content data.

More specifically, the transmission control apparatus acquires the quality information from each communication apparatus 100 by transmitting a quality information transmission request to each communication apparatus 100 so that each communication apparatus 100 transmits the quality information. Here, the quality information transmission request according to the embodiment of the disclosure refers to data indicating a kind of command issued for the apparatus receiving the quality information transmission request to transmit the quality information. Examples of the quality information transmission request transmitted by the transmission control apparatus include items (a) to (c) below.

Examples of Quality Information Transmission Request (a) A quality information transmission request is issued to allow the communication apparatus 100 receiving the quality information transmission request to transmit the quality information including the information regarding the transmission quality unconditionally.

(b) A quality information transmission request (hereinafter, also referred to as a "first quality information transmission request) is issued to selectively transmit the quality information including the information regarding the transmission quality, when the content data indicating the content to be transmitted is stored.

(c) A quality information transmission request (hereinafter, also referred to as a "second quality information transmission request) is issued to selectively transmit the quality information including the information regarding the transmission quality and the information indicating the reproduction quality of the content data, when the content data indicating the content to be transmitted is stored.

(2) Process of Determining Transmission Apparatus

Based on the quality information of each communication apparatus 100 acquired through the process (1) (the process of acquiring the quality information), the transmission control apparatus determines the transmission apparatus transmitting the content data indicating the content to be transmitted. More specifically, the transmission control apparatus determines, as the transmission apparatus, the apparatus having the higher transmission quality of the communication path with the relay apparatus 200.

Here, for example, the transmission control apparatus determines, as the transmission apparatus, the communication apparatus 100 having the higher transmission quality of the communication path with the relay apparatus 200 among the communication apparatuses 100 respectively corresponding to the acquired quality information. However, the method of determining the transmission apparatus by the transmission control apparatus is not limited thereto. For example, when the transmission control apparatus has the function of concurrently transmitting the content data, the transmission control apparatus may determine, as the transmission apparatus, an apparatus (the own apparatus or the communication apparatus 100) having the higher transmission quality of the communication path with the relay apparatus 200 based on the acquired quality information and the information regarding the transmission quality of the communication path between the own apparatus and the relay apparatus 200.

When the acquired quality information includes the information regarding the transmission quality and the information regarding the reproduction quality of the content data, the transmission control apparatus determines the transmission apparatus based on the transmission quality and the reproduction quality of the content data. Moreover, when the transmission control apparatus has the function of concurrently transmitting the content data, the transmission control apparatus may determine the transmission apparatus based on the information indicating the reproduction quality of the content data stored in the storage unit (described below).

The transmission control apparatus determines the transmission apparatus, for example, in the above-described manner through the process (2). A specific example of the process (2) (the process of determining the transmission apparatus) of the transmission control apparatus according to the embodiment of the disclosure will be described below.

(3) Transmission Control Process

When the transmission apparatus is determined through the process (2) (the process of determining the transmission apparatus), the determined transmission apparatus concurrently transmits the content data indicating the content to be transmitted.

More specifically, when an external apparatus is determined as the transmission apparatus, for example, the transmission control apparatus transmits the content data becoming the transmission candidate indicated by the operation signal which is based on the predetermined user operation and the transmission start request in order to allow the transmission apparatus to concurrently transmit the content data. When the transmission control apparatus transmits the first quality information transmission request or the second quality information transmission request, the determined transmission apparatus stores the content data to be transmitted. Therefore, in this case, for example, the transmission control apparatus transmits only the transmission start request to the transmission apparatus. Here, the transmission start request according to the embodiment of the disclosure refers to data which indicates a kind of command issued for the apparatus (that is, the determined transmission apparatus) receiving the transmission start request to start a process associated with the concurrent transmission of the content data.

When the own apparatus is determined as the transmission apparatus, for example, the transmission control apparatus concurrently transmits the content data becoming the transmission candidate indicated by the operation signal which is based on the predetermined user operation.

The transmission control process of the transmission control apparatus according to the embodiment of the disclosure is not limited to the above example. For example, when the transmission control apparatus determines the transmission apparatus based on the quality information selectively transmitted from the communication apparatus 100 in response to the first quality information transmission request or the second quality information transmission request, the transmission control apparatus can concurrently transmit the content data indicating the content to be transmitted which is stored in the corresponding transmission apparatus.

The transmission control apparatus controls the transmission of the content data in the communication system 1000 by performing the process (1) (the process of acquiring the quality information) to the process (3) (the transmission control process). Here, the transmission control apparatus determines the transmission apparatus based on the quality information which is acquired from each communication apparatus 100 of the communication system 1000 and includes at least the information regarding the transmission quality. Therefore, the transmission apparatus can concurrently transmit the content data to the communication apparatuses 100 (or the communication apparatuses 100 with the transmission quality equal to or higher than the given transmission quality) with the higher transmission quality of the communication path with the relay apparatus 200.

Therefore, it is possible to realize the communication system capable of preventing the deterioration in the transmission quality of the content data in the entire communication system by allowing the transmission control apparatus to perform the process (1) (the process of acquiring the quality information) to the process (3) (the transmission control process).

When each apparatus of the communication system 1000 according to the embodiment of the disclosure is configured to transmit the quality information to the other apparatuses regularly or irregularly, the transmission control apparatus may control the transmission of the content data in the communication system 1000 by performing the process (2) (the process of determining the transmission apparatus) and the process (3) (the transmission control process). Even in this case, the transmission apparatus can be determined based on the quality information which is acquired from each communication apparatus 100 of the communication system 1000 and includes the information regarding the transmission quality. Accordingly, even in this case, it is possible to realize the communication system capable of preventing the deterioration in the transmission quality of the content data in the entire communication system by using the transmission control apparatus. Hereinafter, a case will be described in which the transmission control apparatus performs the process (1) (the process of acquiring the quality information) to the process (3) (the transmission control process) as processes associated with the approach to the deterioration prevention of the transmission quality of the content data according to the embodiment of the disclosure.

Specific Example Associated with Approach to Deterioration Prevention of Transmission Quality The process associated with the approach to the deterioration prevention of the transmission quality of the content data according to the above-described embodiment of the disclosure will be described in more detail. Hereinafter, a case will be described in which the communication apparatus 100A has the role of the transmission control apparatus (performs the process (1) (the process of acquiring the quality information) to the process (3) (the transmission control process)) in the communication system 1000 shown in FIG. 1.

Figure 3:
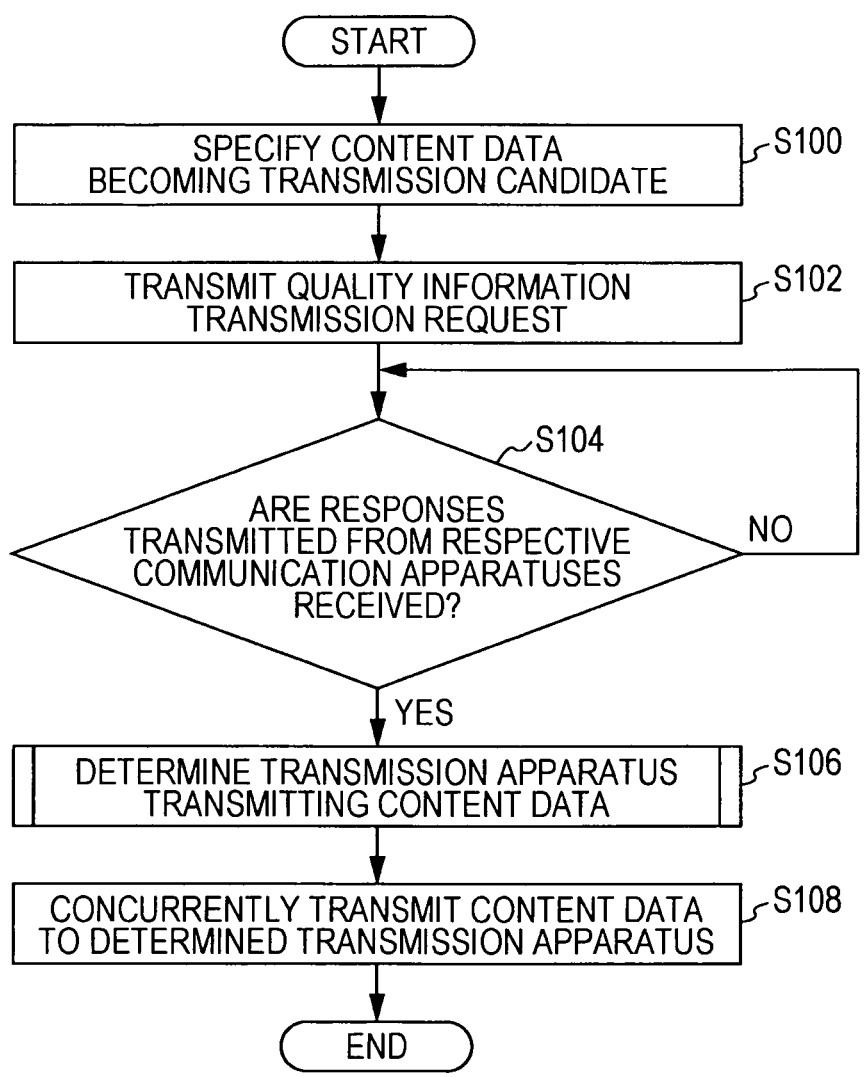
FIG. 3 is a flowchart illustrating an example of a process associated with an approach to deterioration prevention of the transmission quality in a communication apparatus (which is an example of a transmission control apparatus) according to the embodiment of the disclosure.

FIG. 3 is a flowchart illustrating an example of the process associated with the approach to the deterioration prevention of the transmission quality in the communication apparatus 100A (which is an example of the transmission control apparatus) according to the embodiment of the disclosure.

The communication apparatus 100A specifies the content data becoming the transmission candidate (S100). Here, the communication apparatus 100A specifies the content data becoming the transmission candidate based on, for example, the operation signal which is based on the predetermined user operation.

The communication apparatus 100A transmits the quality information transmission request to the communication apparatuses 100B, 100C, and 100D (S102). Here, examples of the quality information transmission request transmitted by the communication apparatus 100A include the quality information transmission requests described in the items (a) to (c).

When the communication apparatus 100A transmits the quality information transmission request in step S102, the communication apparatus 100A determines whether responses transmitted from all of the communication apparatuses 100 to which the quality information transmission request is scheduled to be transmitted are received (S104). Here, the process of step S102 to step S104 corresponds to the process (1) (the process of acquiring the quality information).

When it is determined that the responses transmitted from all of the communication apparatuses 100 to which the quality information transmission request is scheduled to be transmitted are not received in step S104, the communication apparatus 100A does not proceed the process until it is determined that the responses are received. For example, when the quality information transmission request is transmitted in step S102 and a predetermined time passes, the communication apparatus 100A can allow the process to proceed in spite of the fact that it is determined that the responses transmitted from all of the communication apparatuses 100 to which the quality information transmission request is scheduled to be transmitted are not received (so-called timeout).

On the other hand, when it is determined that the responses transmitted from all of the communication apparatuses 100 to which the quality information transmission request is scheduled to be transmitted are received in step S104, the communication apparatus 100A determines the transmission apparatus transmitting the content data (S106; the process of determining the transmission apparatus).

Example of Process of Determining Transmission Apparatus

[1] FIRST EXAMPLE

Example of Process when Quality Information Transmission Request of Item (a) is Transmitted in Step S102 of FIG. 3

When the communication apparatus 100A transmits the quality information transmission request of the item (a) in step S102 of FIG. 3, all of the responses received in step S104 include the quality information including the information regarding the transmission quality. In this case, for example, the communication apparatus 100A determines, as the transmission apparatus, the communication apparatus 100 with the higher transmission quality of the communication path with the relay apparatus 200 among the communication apparatuses 100 respectively corresponding to the acquired quality information.

The communication apparatus 100A is capable of concurrently transmitting the content data like the other communication apparatuses 100. Accordingly, the communication apparatus 100A can determine, as the transmission apparatus, the apparatus (the communication apparatus 100A or another communication apparatus 100) with the higher transmission quality of the communication path with the relay apparatus 200 based on the acquired quality information and the information regarding the transmission quality of the communication path between the own apparatus and the relay apparatus 200.

[2] SECOND EXAMPLE

Example of Process when Quality Information Transmission Request of Item (b) is Transmitted in Step S102 of FIG. 3

When the communication apparatus 100A transmits the quality information transmission request (the first quality information transmission request) of the item (b) in step S102 of FIG. 3, there is a possibility that the responses received in step S104 include the quality information and do not include the quality information coexist. In this case, the communication apparatus 100A determines, as the transmission apparatus, the communication apparatus 100 with the higher transmission quality of the communication path with the relay apparatus 200 among the communication apparatuses 100 transmitting the response including the quality information. As in the first example, the communication apparatus 100A can also determine, as the transmission apparatus, the apparatus with the higher transmission quality of the communication path with the relay apparatus 200 based on the acquired quality information and the information regarding the transmission quality of the communication path between the own apparatus and the relay apparatus 200.

Figure 4:
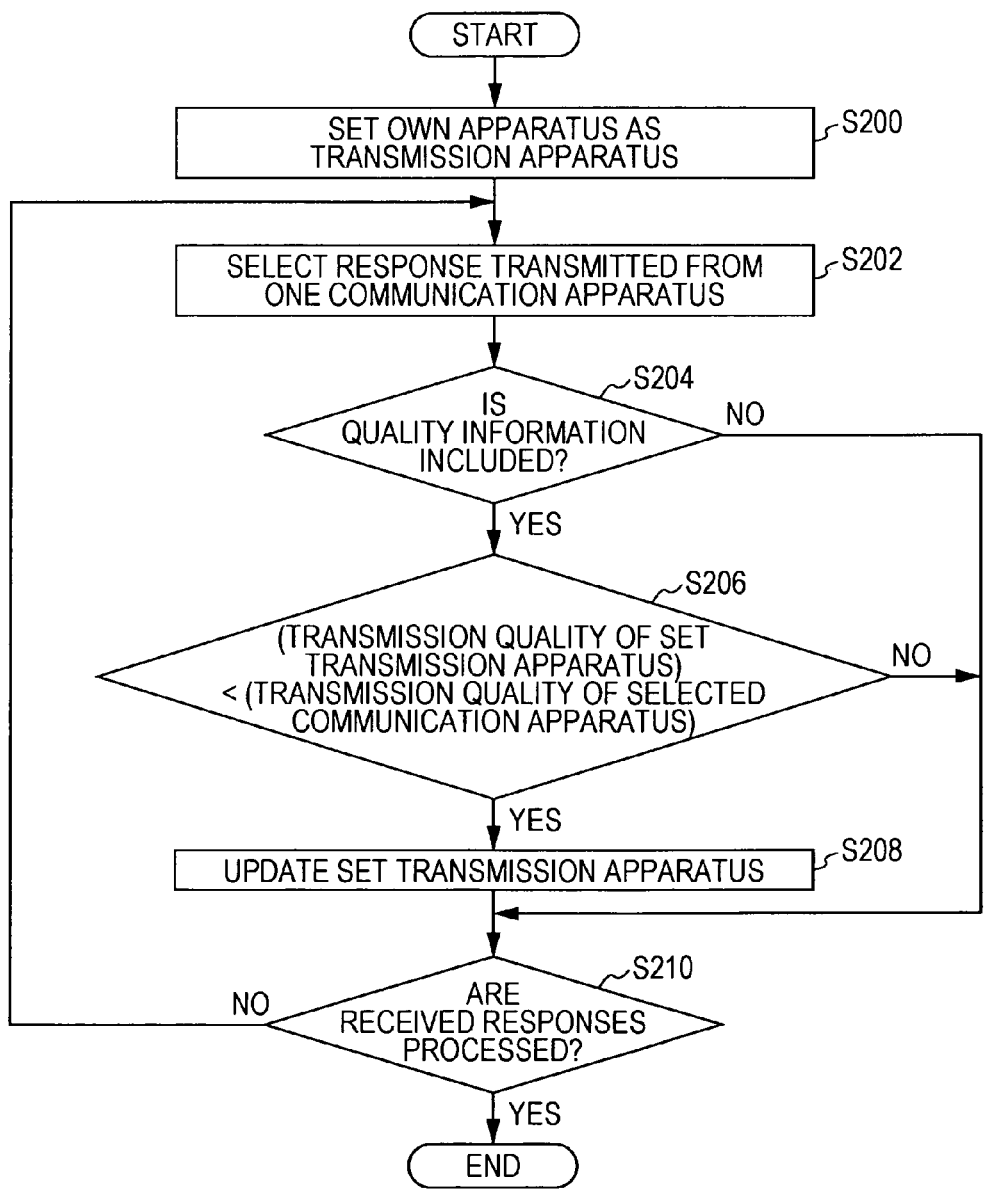
FIG. 4 is a flowchart illustrating an example of a process of determining a transmission apparatus in the communication apparatus (which is an example of a transmission control apparatus) according to the embodiment of the disclosure.

FIG. 4 is a flowchart illustrating an example of the process of determining the transmission apparatus by the communication apparatus 100A (which is an example of the transmission control apparatus) according to the embodiment of the disclosure. In FIG. 4, an example of the process of determining the transmission apparatus is shown when the communication apparatus 100A transmits the quality information transmission request (the first quality information transmission request) of the item (b) in step S102 of FIG. 3. Moreover, in FIG. 4, the example of the process of determining the transmission apparatus is shown when the communication apparatus 100A determines the own apparatus or another communication apparatus 100 as the transmission apparatus.

The communication apparatus 100A sets the own apparatus as the transmission apparatus (S200). Here, the process of step S200 corresponds to a process of initializing the apparatus determined as the transmission apparatus.

The communication apparatus 100A selects the response transmitted from one communication apparatus 100 among the responses received in step S104 of FIG. 3 (S202).

The communication apparatus 100A determines whether the response selected in step S202 includes the quality information (S204). When the communication apparatus 100A determines that the response does not include the quality information in step S204, the communication apparatus 100A performs a process of step S210 described below.

On the other hand, when the communication apparatus 100A determines that the response includes the quality information in step S204, the communication apparatus 100A determines "whether the transmission quality of the set transmission apparatus is higher than (or equal to or higher than) the transmission quality of the selected communication apparatus" (S206). When the communication apparatus 100A determines that "the transmission quality of the set transmission apparatus is not higher than (or equal to or higher than) the transmission quality of the selected communication apparatus" in step S206, the communication apparatus 100A performs the process of step S210 described below.

On the other hand, when the communication apparatus 100A determines that "the transmission quality of the set transmission apparatus is higher than (or equal to or higher than) the transmission quality of the selected communication apparatus" in step S206, the communication apparatus 100A updates the set transmission apparatus to the communication apparatus 100 transmitting the response selected in step S202 (S208). The apparatus with the higher transmission quality is selected as a candidate of the transmission apparatus through the process of step S208.

When the communication apparatus 100A performs the processes of step S204 to S208, the communication apparatus 100A determines whether all of the responses received in step S104 of FIG. 3 are processed (S210).

When the communication apparatus 100A determine that all of the responses are not processed in step S210, the communication apparatus 100A repeats the processes from step S202. On the other hand, when the communication apparatus 100A determines that all of the responses are processed in step S210, the communication apparatus 100A terminates the process of determining the transmission apparatus and determines the apparatus set in step S200 or step S208 as the transmission apparatus.

When the communication apparatus 100A transmits the quality information transmission request (the first quality information transmission request) of the item (b) in step S102 of FIG. 3, the communication apparatus 100A determines the transmission apparatus by performing, for example, the process shown in FIG. 4. Moreover, of course, the process of determining the transmission apparatus when the communication apparatus 100A transmits the quality information transmission request (the first quality information transmission request) of the item (b) in step S102 of FIG. 3 is not limited to the example shown in FIG. 4.

[3] THIRD EXAMPLE

Example of Process when Quality Information Transmission Request of Item (c) is Transmitted in Step S102 of FIG. 3

When the communication apparatus 100A transmits the quality information transmission request (the second quality information transmission request) of the item (c) in step S102 of FIG. 3, there is a possibility that the responses received in step S104 include the quality information and do not include the quality information coexist. In this case, the quality information included in the response received in step S104 includes the information regarding the transmission quality and information indicating the reproduction quality of the content data indicating the content to be transmitted. In this case, the communication apparatus 100A determines, as the transmission apparatus, the communication apparatus 100 capable of transmitting the content data with the transmission quality equal to or higher than the given transmission quality and the higher reproduction quality among the communication apparatuses 100 transmitting the response including the quality information. Moreover, the communication apparatus 100A can also determine, as the transmission apparatus, the apparatus with the higher transmission quality of the communication path with the relay apparatus 200 based on the acquired quality information, the information regarding the transmission quality of the communication path with the relay apparatus 200, and the information indicating the reproduction quality of the content data.

Figure 5:
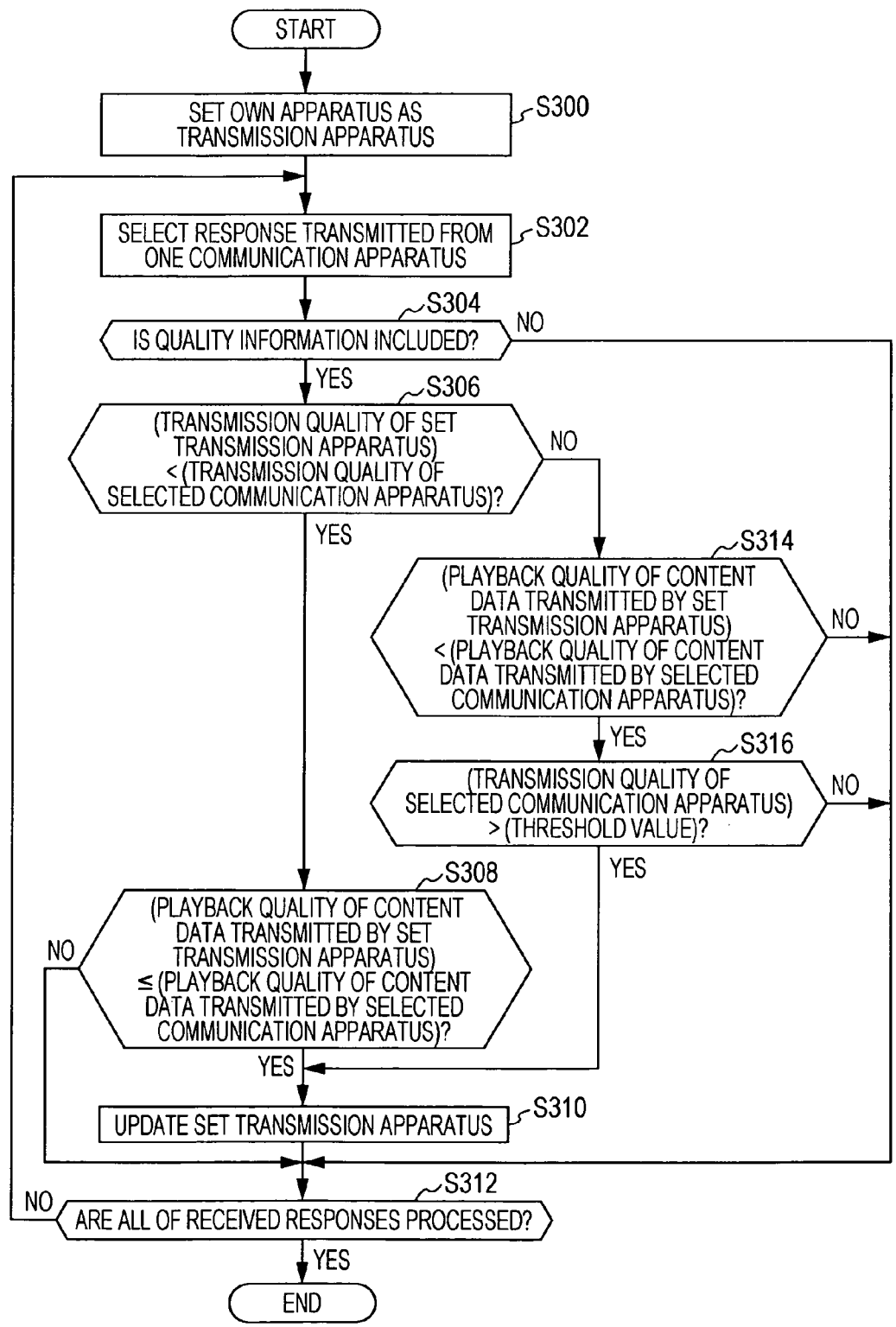
FIG. 5 is a flowchart illustrating an example of a process of determining a transmission apparatus in the communication apparatus (which is an example of a transmission control apparatus) according to the embodiment of the disclosure.

FIG. 5 is a flowchart illustrating an example of the process of determining the transmission apparatus in the communication apparatus 100A (which is an example of the transmission control apparatus) according to the embodiment of the disclosure. In FIG. 5, an example of the process of determining the transmission apparatus is shown when the communication apparatus 100A transmits the quality information transmission request (the second quality information transmission request) of the item (c) in step S102 of FIG. 3. Moreover, in FIG. 5, the example of the process of determining the transmission apparatus is shown when the communication apparatus 100A determines the own apparatus or another communication apparatus 100 as the transmission apparatus.

The communication apparatus 100A sets the own apparatus as the transmission apparatus as in step S200 of FIG. 4 (S300).

The communication apparatus 100A selects the response transmitted from one communication apparatus 100 among the responses received in step S104 of FIG. 3 (S302).

The communication apparatus 100A determines whether the response selected in step S302 includes the quality information (S304). When the communication apparatus 100A determines that the response does not include the quality information in step S304, the communication apparatus 100A performs a process of step S312 described below.

On the other hand, when the communication apparatus 100A determines that the response includes the quality information in step S304, the communication apparatus 100A determines "whether the transmission quality of the set transmission apparatus is higher than the transmission quality of the selected communication apparatus" as in step S206 of FIG. 4 (S306).

<3-A> When it is Determined that Transmission Quality of Set Transmission Apparatus is Higher than Transmission Quality of Selected Communication Apparatus When the communication apparatus 100A determines that "the transmission quality of the set transmission apparatus is higher than the transmission quality of the selected communication apparatus" in step S306, the communication apparatus 100A determines "whether the reproduction quality of the content data transmitted by the set transmission apparatus is equal to or higher than the reproduction quality of the content data transmitted by the selected communication apparatus 100" (S308). Here, the communication apparatus 100A performs the determination of step S308, for example, by comparing information indicating the reproduction quality of the content data of the set transmission apparatus to information indicating the reproduction quality of the content data of the selected communication apparatus.

More specifically, for example, the communication apparatus 100A quantifies each information indicating the reproduction quality of the content data by using a lookup table in which each information (for example, a codec, a bit rate, and resolution) indicating the reproduction quality corresponds to numerical values used to quantify the information indicating the reproduction quality. Then, the communication apparatus 100A performs the determination of step S308 by comparing the information indicating the reproduction quality of the quantified content data. Here, for example, the communication apparatus 100A performs the determination of step S308 by using the lookup table stored in advance. However, the process of step S308 performed by the communication apparatus 100A according to the embodiment of the disclosure is not limited thereto. For example, the communication apparatus 100A may perform the process of step S308 by appropriately acquiring the lookup table from an external apparatus such as a server (not shown). Moreover, of course, the process of step S308 performed by the communication apparatus 100A (which is an example of the transmission control apparatus) according to the embodiment of the disclosure is not limited thereto.

When the communication apparatus 100A determines that "the reproduction quality of the content data transmitted by the set transmission apparatus is not equal to or higher than the reproduction quality of the content data transmitted by the selected communication apparatus 100" in step S308, the communication apparatus 100A performs the process of step S312 described below.

On the other hand, when the communication apparatus 100A determines that "the reproduction quality of the content data transmitted by the set transmission apparatus is equal to or higher than the reproduction quality of the content data transmitted by the selected communication apparatus 100" in step S308, the communication apparatus 100A updates the set transmission apparatus to the communication apparatus 100 transmitting the response selected in step S302 (S310). By the process of step S310, the apparatus with the higher reproduction quality of the content data is set as a candidate of the transmission apparatus among the apparatuses (or the apparatuses with the transmission quality equal to or higher than the given transmission quality) with the higher transmission quality.

When the processes of step S308 and step S310 are performed, the communication apparatus 100A determines whether all of the responses received in step S104 of FIG. 3 are processed (S312).

When the communication apparatus 100A determines that all of the responses are not processed in step S312, the communication apparatus 100A repeats the processes from step S302. On the other hand, when the communication apparatus 100A determines that all of the responses are processed in step S312, the communication apparatus 100A terminates the process of determining the transmission apparatus and determines the apparatus set in step S300 or step S310 as the transmission apparatus.

<3-B> When it is Determined that Transmission Quality of Set Transmission Apparatus is not Higher than Transmission Quality of Selected Communication Apparatus When the communication apparatus 100A determines that "the transmission quality of the set transmission apparatus is not higher than the transmission quality of the selected communication apparatus" in step S306, the communication apparatus 100A determines "whether the reproduction quality of the content data transmitted by the set transmission apparatus is higher than the reproduction quality of the content data transmitted by the selected communication apparatus 100" (S314). Here, as in step S308, the communication apparatus 100A performs the determination of step S314, for example, by comparing information indicating the reproduction quality of the content data of the set transmission apparatus to information indicating the reproduction quality of the content data of the selected communication apparatus.

When the communication apparatus 100A determines that "the reproduction quality of the content data transmitted by the set transmission apparatus is not higher than the reproduction quality of the content data transmitted by the selected communication apparatus 100" in step S314, the communication apparatus 100A performs the process of step S312.

When the communication apparatus 100A determines that "the reproduction quality of the content data transmitted by the set transmission apparatus is higher than the reproduction quality of the content data transmitted by the selected communication apparatus 100" in step S314, the communication apparatus 100A determines "whether the value indicating the transmission quality of the selected communication apparatus 100 is larger than (or equal to or larger than) a predetermined threshold value" (S316). Here, the predetermined threshold value refers to a preset value used to determine the apparatus with the transmission quality of the communication path with the relay apparatus 200 which is equal to or larger than a given value. The predetermined threshold value is set according to the kind (for example, a transmission speed or the number of data retransmission requests) of the value indicating the transmission quality.

When the communication apparatus 100A determines that "the value indicating the transmission quality of the selected communication apparatus 100 is larger than the predetermined threshold value" in step S316, the communication apparatus 100A performs the process of step S310. On the other hand, when the communication apparatus 100A determines that "the value indicating the transmission quality of the selected communication apparatus 100 is not larger than the predetermined threshold value" in step S316, the communication apparatus 100A performs the process of step S312.

When the communication apparatus 100A transmits the quality information transmission request (the second quality information transmission request) of the item (c) in step S102 of FIG. 3, the communication apparatus 100A determines the transmission apparatus, for example, by performing the processes shown in FIG. 5.

The process of determining the transmission apparatus when the communication apparatus 100A transmits the quality information transmission request (the second quality information transmission request) of the item (c) in step S102 of FIG. 3 is not limited to the example described with reference to FIG. 5. For example, the communication apparatus 100A may preferentially determine, as the transmission apparatus, the apparatus storing the content data with the higher reproduction quality of the content data indicating the content to be transmitted.

Figure 6:
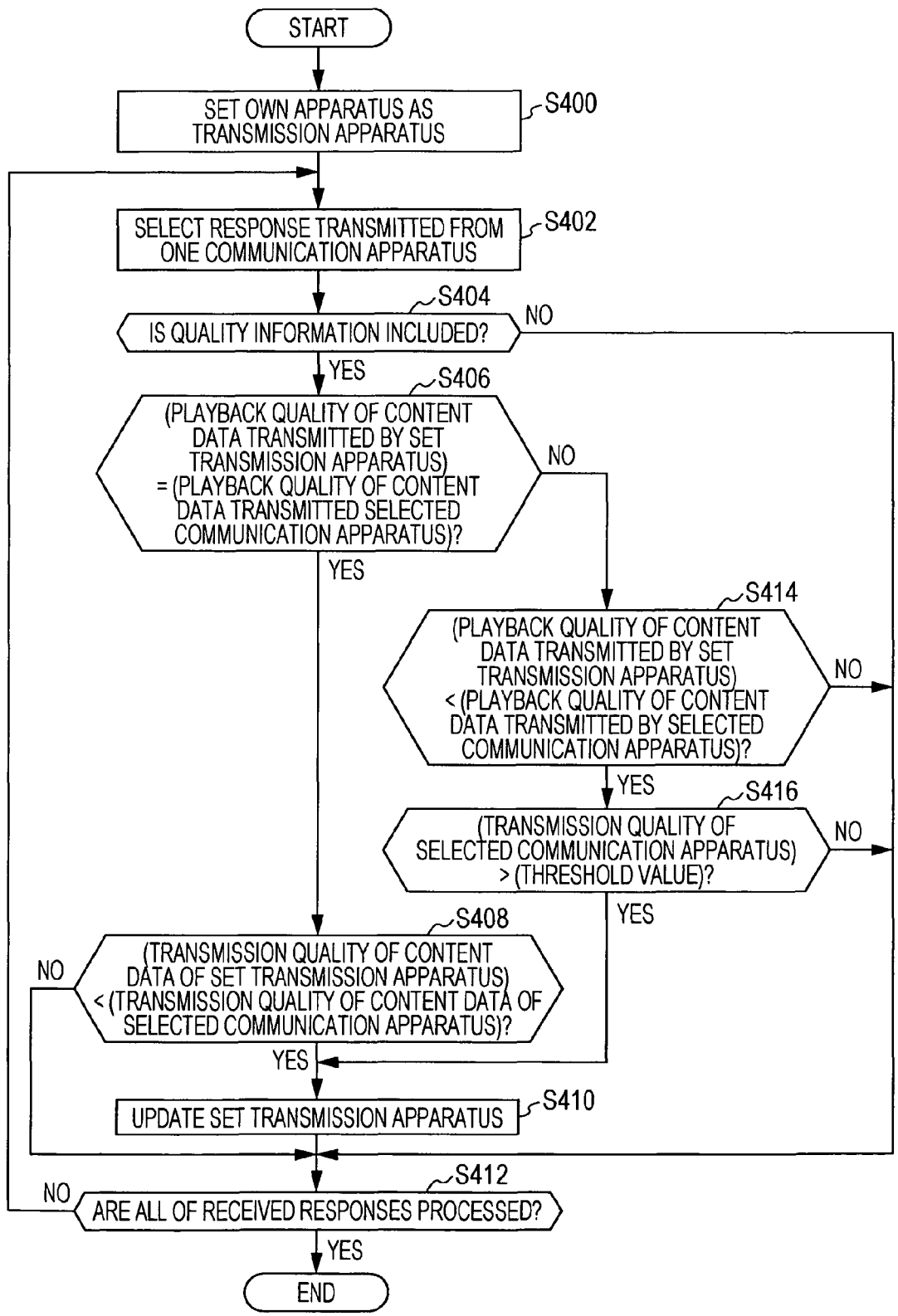
FIG. 6 is a flowchart illustrating an example of a process of determining a transmission apparatus in the communication apparatus (which is an example of a transmission control apparatus) according to the embodiment of the disclosure.

FIG. 6 is a flowchart illustrating an example of the process of determining the transmission apparatus in the communication apparatus 100A (which is an example of the transmission control apparatus) according to the embodiment of the disclosure. In FIG. 6, another example of the process of determining the transmission apparatus is shown when the communication apparatus 100A transmits the quality information transmission request (the second quality information transmission request) of the item (c) in step S102 of FIG. 3. Moreover, in FIG. 6, the example of the process of determining the transmission apparatus is shown when the communication apparatus 100A determines the own apparatus or another communication apparatus 100 as the transmission apparatus.

The communication apparatus 100A sets the own apparatus as the transmission apparatus as in step S200 of FIG. 4 (S400).

The communication apparatus 100A selects the response transmitted from one communication apparatus 100 among the responses received in step S104 of FIG. 3 (S402).

The communication apparatus 100A determines whether the response selected in step S402 includes the quality information (S404). When the communication apparatus 100A determines that the response does not include the quality information in step S404, the communication apparatus 100A performs a process of step S412 described below.

On the other hand, when the communication apparatus 100A determines that the response includes the quality information in step S404, the communication apparatus 100A determines "whether the reproduction quality of the content data transmitted by the set transmission apparatus is equal to the reproduction quality of the content data transmitted by the selected communication apparatus 100" (S406). Here, as in step S308 of FIG. 5, the communication apparatus 100A performs the determination of step S406, for example, by comparing information indicating the reproduction quality of the content data of the set transmission apparatus to information indicating the reproduction quality of the content data of the selected communication apparatus.

<3-a> When it is Determined that Reproduction Quality of Content Data Transmitted by Set Transmission Apparatus is Equal to Reproduction Quality of Content Data Transmitted by Selected Communication Apparatus 100

When the communication apparatus 100A determines that "the reproduction quality of the content data transmitted by the set transmission apparatus is equal to the reproduction quality of the content data transmitted by the selected communication apparatus 100" in step S406, as in step S206 of FIG. 4, the communication apparatus 100A determines "whether the transmission quality of the set transmission apparatus is higher than the transmission quality of the selected communication apparatus" (S408).

When the communication apparatus 100A determines that "the transmission quality of the set transmission apparatus is not higher than the transmission quality of the selected communication apparatus" in step S408, the communication apparatus 100A performs a process of step S412 described below.

On the other hand, when the communication apparatus 100A determines that "the transmission quality of the set transmission apparatus is higher than the transmission quality of the selected communication apparatus" in step S408, the communication apparatus 100A updates the set transmission apparatus to the communication apparatus 100 transmitting the response selected in step S402 (S410). By the process of step S410, the apparatus (or the apparatuses with the transmission quality equal to or higher than a given transmission quality) with the higher transmission quality of the content data is set as a candidate of the transmission apparatus among the apparatuses with the higher reproduction quality of the content data.

When the processes of step S408 and step S410 are performed, the communication apparatus 100A determines whether all of the responses received in step S104 of FIG. 3 are processed (S412).

When the communication apparatus 100A determines that all of the responses are not processed in step S412, the communication apparatus 100A repeats the processes from step S402. On the other hand, when the communication apparatus 100A determines that all of the responses are processed in step S412, the communication apparatus 100A terminates the process of determining the transmission apparatus and determines the apparatus set in step S400 or step S410 as the transmission apparatus.

<3-b> When it is Determined that Reproduction Quality of Content Data Transmitted by Set Transmission Apparatus is Not Equal to Reproduction Quality of Content Data Transmitted by Selected Communication Apparatus 100

When the communication apparatus 100A determines that "the reproduction quality of the content data transmitted by the set transmission apparatus is not equal to the reproduction quality of the content data transmitted by the selected communication apparatus 100" in step S406, as in step S314 of FIG. 4, the communication apparatus 100A determines "whether the reproduction quality of the content data transmitted by the set transmission apparatus is higher than the reproduction quality of the content data transmitted by the selected communication apparatus 100" (S414).

When the communication apparatus 100A determines that "the reproduction quality of the content data transmitted by the set transmission apparatus is higher than the reproduction quality of the content data transmitted by the selected communication apparatus 100" in step S414, the communication apparatus 100A performs the process of step S412.

On the other hand, when the communication apparatus 100A determines that "the reproduction quality of the content data transmitted by the set transmission apparatus is higher than the reproduction quality of the content data transmitted by the selected communication apparatus 100" in step S414, the communication apparatus 100A determines "whether the value indicating the transmission quality of the selected communication apparatus 100 is larger than (or equal to or larger than) a predetermined threshold value" (S416) as in step S316 of FIG. 5.

When the communication apparatus 100A determines that "the value indicating the transmission quality of the selected communication apparatus 100 is larger than the predetermined threshold value" in step S416, the communication apparatus 100A performs the process of step S410. On the other hand, when the communication apparatus 100A determines that "the value indicating the transmission quality of the selected communication apparatus 100 is not larger than the predetermined threshold value" in step S416, the communication apparatus 100A performs the process of step S412.

When the communication apparatus 100A transmits the quality information transmission request (the second quality information transmission request) of the item (c) in step S102 of FIG. 3, the communication apparatus 100A can also determine the transmission apparatus, for example, by performing the processes shown in FIG. 6. Of course, the process of determining the transmission apparatus when the communication apparatus 100A transmits the quality information transmission request (the second quality information transmission request) of the item (c) in step S102 of FIG. 3 is not limited to the examples described with reference to FIGS. 5 and 6.

[4] OTHER EXAMPLES

The communication apparatus 100A determines the transmission apparatus transmitting the content data, for example, by performing the processes of the first to third examples. The process of determining the transmission apparatus in the communication apparatus 100A (which is an example of the transmission control apparatus) according to the embodiment of the disclosure is not limited to the processes described in the first to third examples. For example, based on information in which a preference is set according to the kind (for example, data kinds of sound data, video data, or the like or a specific content) of the content to be transmitted, the communication apparatus 100A may preferentially determine, as the transmission apparatus, the apparatus in which the high preference is set. Moreover, the communication apparatus 100A may determine the transmission apparatus by setting the preference of each communication apparatus 100 based on positional information (for example, positional information of a content which is being reproduced and a user enjoys) of a user.

Referring back to FIG. 3, an example of a process associated with the approach to the deterioration prevention of the transmission quality in the communication apparatus 100A (which is an example of the transmission control apparatus) according to the embodiment of the disclosure will be described. When the transmission apparatus is determined in step S106, the communication apparatus 100A concurrently transmits the content data indicating the content to be transmitted to the determined transmission apparatus (S108; the transmission control process).

Here, when the communication apparatus 100A determines an external apparatus as the transmission apparatus, for example, the communication apparatus 100A transmits the content data becoming a transmission candidate indicated by the operation signal which is based on a predetermined user operation and a transmission start request to the transmission apparatus and concurrently transmits the content data to the transmission apparatus. When the communication apparatus 100A transmits the first quality information transmission request or the second quality information transmission request, the determined transmission apparatus stores the content data to be transmitted. Accordingly, in this case, for example, the communication apparatus 100A transmits only the transmission start request to the transmission apparatus.

When the own apparatus is determined as the transmission apparatus, for example, the communication apparatus 100A concurrently transmits the content data becoming the transmission candidate indicated by the operation signal which is based on the predetermined user operation.

The communication apparatus 100A can realize the process (1) (the process of acquiring the quality information) to the process (3) (the transmission control process) (the process associated with the approach to the deterioration prevention of the transmission quality according to the embodiment of the disclosure), for example, by performing the processes described with reference to FIG. 3. Accordingly, the communication apparatus 100A can realize the communication system capable of preventing the deterioration in the transmission quality of the content data in the entire communication system, for example, by performing the processes described with reference to FIG. 3.

Transmission Control Apparatus according to Embodiment of Disclosure

Next, an example of the configuration of the transmission control apparatus will be described which is capable of realizing the process associated with the approach to the deterioration prevention of the transmission quality of the content data according to the above-described embodiment of the disclosure. Hereinafter, an example of the configuration of the transmission control apparatus will be described when the communication apparatus 100 has the function of the transmission control apparatus.

FIG. 7 is a block diagram illustrating an example of the configuration of the transmission control apparatus according to the embodiment of the disclosure. In FIG. 7, an example of the configuration of the communication apparatus 100 having the function of the transmission control apparatus is illustrated as an example of the configuration of the transmission control apparatus.

The communication apparatus 100 includes a communication unit 102, a storage unit 104, a control unit 106, an operation unit 108, and a display unit 110.

The communication apparatus 100 may include a ROM (Read Only Memory; not shown), a RAM (Random Access Memory; not shown), a reproduction processing unit (not shown), a sound output unit (not shown), and a reception unit (not shown). In the communication apparatus 100, for example, the constituent units are connected to each other via a bus serving as a data transmission line.

Here, the ROM (not shown) stores control data such as a program or a calculation parameter used by the control unit 106. The RAM (not shown) firstly stores a program or the like executed by the control unit 106. The reproduction processing unit (not shown) performs a process associated with reproduction of the content data. The sound output unit (not shown) outputs, for example, a sound such as a sound corresponding to the content data reproduced by the reproduction processing unit (not shown). The reception unit (not shown) receives an external operation signal transmitted from an external apparatus such as a remote controller.

Example of Hardware Configuration of Communication Apparatus 100

FIG. 8 is a diagram illustrating an example of the hardware configuration of the transmission control apparatus according to the embodiment of the disclosure. In FIG. 8, an example of the hardware configuration of the communication apparatus 100 shown in FIG. 7 is shown. Referring to FIG. 8, for example, the communication apparatus 100 includes an MPU 150, a ROM 152, a RAM 154, a recording medium 156, an input/output interface 158, an operation input device 160, a display device 162, a communication interface 164, a DSP 166, and a sound output device 168. In the communication apparatus 100, for example, the constituent units are connected to each other via a bus 170 serving as a data transmission line.

The MPU 150 is configured by, for example, an MPU (Micro Processing Unit) or an integrated circuit in which a plurality of circuits is integrated to realize a control function. The MPU 150 functions as the control unit 106 controlling the entire communication apparatus 100. The MPU 150 has a role of a request transmission unit 120, a determination unit 122, and a transmission control unit 124 described below in the communication apparatus 100.

The ROM 152 stores control data or the like such as a program or a calculation parameter used by the MPU 150. The RAM 154 firstly stores a program or the like executed by the MPU 150.

The recording medium 156 functions as the storage unit 104. For example, the recording medium 156 stores the content data and various kinds of data such as an application and a lookup table in which each information indicating the reproduction quality and each numerical value for quantifying the information indicating the reproduction quality correspond to each other. Examples of the recording medium 156 include a magnetic recording medium such as a hard disk and a nonvolatile memory such as an EEPROM (Electrically Erasable and Programmable Read Only Memory), a flash memory, an MRAM (Magnetoresistive Random Access Memory), a FeRAM (Ferroelectric Random Access Memory), or a PRAM (Phase change Random Access Memory). The communication apparatus 100 may include a recording medium 156 detachably mounted on the communication apparatus 100.

For example, the input/output interface 158 is connected to the operation input device 160 or the display device 162. The operation input device 160 functions as an operation unit 108 and the display device 162 functions as the display unit 110. Examples of the input/output interface 158 include a USB (Universal Serial Bus) terminal, a DVI (Digital Visual Interface) terminal, an HDMI (High-Definition Multimedia Interface) terminal, and various kinds of processing circuits. For example, the operation input device 160 can be mounted on the communication apparatus 100 to be connected to the input/output interface 158 inside the communication apparatus 100. Examples of the operation input device 160 include a button, a direction key, a rotation type selector such as a jog dial, and a combination thereof. For example, the display device 162 is mounted on the communication apparatus 100 to be connected to the input/output interface 158 inside the communication apparatus 100. Examples of the display device 162 include a liquid crystal display (LCD) and an organic EL (ElectroLuminescence) display (or also referred to as an OLED (Organic Light Emitting Diode) display). Of course, the input/output interface 158 can be connected to an operation input device (for example, a keyboard or a mouse) or a display device (for example, an external display) which is an external device of the communication apparatus 100. The display device 162 may be a device, such as a touch screen, in which a display and a user operation can be performed.

The communication interface 164 is a communication device included in the communication apparatus 100 and functions as the communication unit 102 performing wireless/wired communication with an external apparatus such as another communication apparatus 100 or a server (not shown) via the relay apparatus 200. Examples of the communication interface 164 include an IEEE 802.11g port, a transceiver circuit (wireless communication), a LAN (Local Area Network) terminal, and a transceiver circuit (wired communication).

The communication apparatus 100 may include a plurality of communication interfaces such as the communication interface 164 and a communication interface functioning as a reception unit (not shown). Examples of the communication interface functioning as the reception unit (not shown) include an IEEE 802.15.1 port, a transceiver circuit, and an infrared communication module. The communication interface 164 of the communication apparatus 100 may have a configuration functioning as, for example, the communication unit 102 and a reception unit (not shown).

The DSP 166 has a role of a reproduction processing unit (not shown) reproducing the content data stored in the storage medium 156 or the content data received by the communication interface 164. The DSP 166 includes a DSP or various kinds of processing circuits and processes sound data. The sound output device 168 has a role of an output unit (not shown) outputting a sound according to the reproduced content data and outputs the sound corresponding to the sound data processed by the DSP 166. Examples of the sound output device include an amplifier and a speaker.

The communication apparatus 100 has, for example, the configuration shown in FIG. 8 and performs the process associated with the approach to the deterioration prevention of the transmission quality of the content data according to the embodiment of the disclosure. The hardware configuration of the communication apparatus 100 according to the embodiment of the disclosure is not limited to the configuration shown in FIG. 8. For example, the communication apparatus 100 has the role of the reproduction processing unit (not shown) and may have a video processing circuit processing video data (which is a kind of content data). When the communication apparatus 100 does not have the reproduction processing unit (not shown) or the sound output unit (not shown), the communication apparatus 100 may not have the DSP 166, the sound output device 168, or the video processing circuit (not shown).

Referring back to FIG. 7, the constituent units of the communication apparatus 100 will be described. The communication unit 102 is a communication device included in the communication apparatus 100 and performs wireless/wired communication with an external apparatus such as another communication apparatus 100 or a server (not shown) via the relay apparatus 200. Moreover, the communication of the communication unit 102 is controlled by, for example, the control unit 106. Examples of the communication unit 102 include an IEEE 802.11g port, a transceiver circuit (wireless communication), a LAN terminal, and a transceiver circuit (wired communication).

The storage unit 104 is a storage device included in the communication apparatus 100. Examples of the storage unit 104 include a magnetic recording medium such as a hard disk and a non-volatile memory such as a flash memory.

The storage unit 104 stores various kinds of data such as an application and a lookup table in which each information indicating the reproduction quality and each numerical value for quantifying the information indicating the reproduction quality correspond to each other. In FIG. 7, for example, content data A130, content data B132, and so on are stored in the storage unit 104.

The control unit 106 is configured by, for example, an MPU or an integrated circuit in which a plurality of processing circuits is integrated to have a role of controlling the entire communication apparatus 100. The control unit 106 includes the request transmission unit 120, the determination unit 122, and the transmission control unit 124. The control unit 106 has a leading role of processing the process associated with the approach to the deterioration prevention of the transmission quality of the content data according to the embodiment of the disclosure.

The request transmission unit 120 has a leading role of performing the process (1) (the process of acquiring the quality information). More specifically, the request transmission unit 120 generates the quality information transmission request and transmits the generated quality information transmission request to each communication apparatus 100.

The request generated by the request transmission unit 120 is not limited to the quality information transmission request. For example, the request transmission unit 120 may generate a transmission start request based on a generation command from the transmission control unit 124. The request transmission unit 120 can generate data indicating various requests such as a data retransmission request.

The determination unit 122 has a leading role of performing the process (2) (the process of determining the transmission apparatus). More specifically, the determination unit 122 determines the transmission apparatus, for example, by performing the processes described in the examples [1] to [4]. The determination unit 122 transmits information indicating the determined transmission apparatus to the transmission control unit 124.

The transmission control unit 124 has a leading role of performing the process (3) (the transmission control process). More specifically, for example, the transmission control unit 124 transmits the transmission start request to the transmission apparatus determined by the determination unit 122 and allows the transmission apparatus to concurrently transmit the content data indicating the content to be transmitted. For example, the transmission start request may be generated by the transmission control unit 124 or the transmission control unit 124 may allow the request transmission unit 120 to generate the transmission start request.

For example, the control unit 106 includes the request transmission unit 120, the determination unit 122, and the transmission control unit 124 and has a leading role of performing the process (1) (the process of acquiring the quality information) to the process (3) (the transmission control process). The configuration of the control unit 106 is not limited to the configuration shown in FIG. 7. For example, the control unit 106 may include a process start determination unit (not shown) which allows the own apparatus serving as the transmission control apparatus to selectively start the process based on an operation signal based on a predetermined user operation transmitted from the operation unit 108 or the reception unit (not shown) or an external operation signal. Here, the process start determination unit (not shown) has a leading role of performing the process (0) (the process of determining the transmission control apparatus) in the communication apparatus 100.

The operation unit 108 is an operation device which is capable of performing an operation of a user and is included in the communication apparatus 100. The communication apparatus 100 includes the operation unit 108 and is capable of performing an operation of a user to perform a user's desired process in response to the operation of the user. Examples of the operation unit 108 include a button, a direction key, a rotation type selector such as jog dial, and a combination thereof.

The display unit 110 is a display device included in the communication apparatus 100 and displays various kinds of information on a display screen. Examples of screens displayed on the display screen of the display unit 110 include an operation screen used to perform a desired operation in the communication apparatus 100 and a content reproduction screen used to reproduce the content data. Examples of the display unit 110 include an LCD and an organic EL display. Moreover, the communication apparatus 100 may include the display unit 110 configured by, for example, a touch screen. In this case, the display unit 110 functions as an operation display unit capable of performing both an operation of a user and display.

The communication apparatus 100 has, for example, the configuration shown in FIG. 7 so as to realize the process associated with the approach to the deterioration approach of the transmission quality of the content data according to the embodiment of the disclosure. That is, the communication apparatus 100 has, for example, the configuration shown in FIG. 7 so as to have the role of the transmission control apparatus. Accordingly, the communication apparatus 100 has, for example, the configuration shown in FIG. 7 so as to realize the communication system capable of preventing the deterioration in the transmission quality of the content data in the entire communication system. Moreover, of course, the configuration of the communication apparatus 100 according to the embodiment of the disclosure is not limited to the configuration shown in FIG. 7.

In the foregoing description, an example of the configuration of the transmission control apparatus has been described, for example, when the communication apparatus 100 has the function of the transmission control apparatus. However, the apparatus having the function of the transmission control apparatus in the communication system 1000 according to the embodiment of the disclosure is not limited to the communication apparatus 100. For example, the relay apparatus 200 may have the function of the transmission control apparatus in the communication system 1000. Alternatively, the communication system 1000 may have a configuration in which a transmission control apparatus separate from the communication apparatus 100 and the relay apparatus 200 may be provided. In this case, the transmission control apparatus separate from the relay apparatus 200 can realize the process associated with the approach to the deterioration prevention of the transmission quality of the content data according to the embodiment of the disclosure by including the communication unit communicating with an external apparatus and including units (for example, including the request transmission unit 120, the determination unit 122, and the transmission control unit 124) having the leading role of the process (1) (the process of acquiring the quality information) to the process (3) (the transmission control process).

As described above, the communication system 1000 according to the embodiment of the disclosure includes the communication apparatuses 100 and the relay apparatus 200 and the respective communication apparatuses 100 communicate with each other via the relay apparatus 200. In the communication system 1000, the apparatus (hereinafter, referred to as a "transmission control apparatus") having the role of the transmission control apparatus controls the transmission of the content data in the communication system 1000 by performing the process (1) (the process of acquiring the quality information) to the process (3) (the transmission control process). For example, the transmission control apparatus determines, as the transmission apparatus, an apparatus (the own apparatus or the communication apparatus 100) with the higher transmission quality of the communication path between the apparatus and the relay apparatus 200 or an apparatus having transmission quality equal to or higher than given transmission quality, for example, based on the quality information acquired from another communication apparatus 100. Moreover, for example, the transmission control apparatus determines, as the transmission apparatus, an apparatus capable of transmitting the content data with the higher reproduction quality among the apparatuses with transmission quality equal to or higher than given transmission quality, for example, based on the transmission quality of the communication path between the apparatus and the relay apparatus 200 and the reproduction quality of the content data to be transmitted. The transmission control apparatus allows the determined transmission apparatus to concurrently transmit the content data indicating a content to be transmitted to the other apparatuses via the relay apparatus 200. The transmission control apparatus controls the transmission of the content data in the communications system 1000, as described above, so that the communication system 1000 can reduce the possibility that the transmission quality of the communication path between the transmission apparatus and the relay apparatus 200 is not sufficient to concurrently transmit the content data.

Accordingly, it is possible to realize the communication system capable of preventing the deterioration in the transmission quality of the content data in the entire communication system by controlling the transmission of the content data in the communication system 1000 by the transmission control apparatus, as described above.

In the foregoing description, the communication apparatus 100 is an example of the constituent apparatuses of the communication system 1000 according to the embodiment of the disclosure, but the embodiment of the disclosure is not limited thereto. The embodiment of the disclosure is applicable to various apparatuses such as a computer such as a PC (Personal Computer), a server, or a PDA (Personal Digital Assistant), a portable communication apparatus such as a cell phone or a PHS (Personal Handyphone System), a video/ music reproduction apparatus, a video/music recording reproduction apparatus, and a game console.

The relay apparatus 200 is an example of the constituent apparatuses of the communication system 1000 according to the embodiment of the disclosure, but the embodiment of the disclosure is not limited thereto. The embodiment of the disclosure is applicable to various apparatuses, such as a HUB and an access point, capable of relaying communication between the communication apparatuses 100.

As described above, the communication apparatuses 100 and/or the relay apparatus 200 shown in FIG. 1 can have the role of the transmission control apparatus according to the embodiment of the disclosure. The communication system 1000 according to the embodiment of the disclosure may include a transmission control apparatus separate from the communication apparatus 100 and the relay apparatus 200.
Program According to Embodiment of Disclosure The transmission of the content data in the communication system 1000 can be controlled by a program causing a computer to function as the transmission control apparatus according to the embodiment of the disclosure. Accordingly, it is possible to realize the communication system capable of preventing the deterioration in the transmission quality of the content data in the entire communication system by using the program causing a computer to function as the transmission control apparatus according to the embodiment of the disclosure.

The preferred embodiment of the disclosure has hitherto been described with reference to the accompanying drawings, but the disclosure is not, of course, limited to the embodiment. It is apparent to those skilled in the art that the disclosure can be modified or altered into various forms within the scope of the appended claims and it should be understood that the modifications and alternations pertain to the technical scope of the disclosure.

For example, the communication apparatus (the same is applied to the other apparatuses) having the role of the transmission control apparatus according to the embodiment of the disclosure may individually include the request transmission unit 120, the determination unit 122, or the transmission control unit 124 shown in FIG. 7 (for example, each unit is realized by an individual processing circuit).

In the foregoing description, there is provided the program (computer program) causing the computer to function as the transmission control apparatus according to the embodiment of the disclosure. In the embodiment of the disclosure, however, a storage medium storing the program may also be provided together.

The above-described configuration is an example of the embodiment of the disclosure, and of course pertains to the technical scope of the disclosure.

The present disclosure contains subject matter related to that disclosed in Japanese Priority Patent Application JP 2010-131340 filed in the Japan Patent Office on Jun. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission control apparatus comprising:
a communication unit configured to transmit content data to reception apparatuses, said communication unit being configured to receive transmission quality information from each of the reception apparatuses;
a determination unit configured to use said transmission quality information from said each of the reception apparatuses to perform a comparison, said comparison identifying a transmission quality of a communication path between a relay apparatus and one of the reception apparatuses;
a transmission control unit configured to generate a transmission start request, said transmission start request commanding only said one of the reception apparatuses to retransmit said content data through said communication path to said communication unit,
wherein said transmission quality of the communication path is higher than a transmission quality of a different communication path, said different communication path being between said relay apparatus and a different one of the reception apparatuses.

2. The transmission control apparatus according to claim 1, wherein said communication unit is configured to transmit said content data to said relay apparatus, said relay apparatus retransmitting said content data to said reception apparatuses.

3. The transmission control apparatus according to claim 1, wherein said communication unit is configured to transmit a quality information transmission request to said reception apparatuses, said quality information transmission request commanding said reception apparatuses to output said transmission quality information.

4. The transmission control apparatus according to claim 3, wherein said quality information transmission request is transmitted through said relay apparatus to said reception apparatuses.

5. The transmission control apparatus according to claim 1, wherein said communication unit is configured to receive said transmission quality information from said relay apparatus, said relay apparatus receiving said transmission quality information from reception apparatuses.

6. The transmission control apparatus according to claim 1, wherein said communication unit is configured to transmit said transmission start request to said relay apparatus, said relay apparatus retransmitting said transmission start request to said reception apparatuses.

7. The transmission control apparatus according to claim 1, wherein said reception apparatuses are configured to transmit said transmission quality information to any other of the reception apparatuses.

8. The transmission control apparatus according to claim 1, wherein said transmission quality of the communication path is a transmission speed of the communication path.

9. The transmission control apparatus according to claim 8, wherein a data retransmission request number is an amount of data retransmission requests between said relay apparatus and said one of the reception apparatuses, said transmission quality of the communication path being said data retransmission request number.

10. The transmission control apparatus according to claim 8, wherein said transmission quality of the different communication path is a transmission speed of the different communication path.

11. A transmission control method comprising:
a step (a) of transmitting electronically a quality information transmission request to reception apparatuses, said quality information transmission request commanding each of the reception apparatuses to output transmission quality information;
a step (b) of using said transmission quality information from each of the reception apparatuses to perform a comparison, said comparison identifying a transmission quality of a communication path between a relay apparatus and one of the reception apparatuses;

a step (c) of transmitting electronically a transmission start request from a communication unit to said relay apparatus, said relay apparatus retransmitting said transmission start request to said reception apparatuses;

a step (d) of transmitting electronically content data from said communication unit to said each of the reception apparatuses, said transmission start request commanding only said one of the reception apparatuses to retransmit said content data through said communication path to said communication unit, wherein said transmission quality of the communication path is higher than a transmission quality of a different communication path, said different communication path being between said relay apparatus and a different one of the reception apparatuses.

12. The transmission control method according to claim 11, wherein said step (c) is performed before said step (d).

13. The transmission control method according to claim 11, wherein said content data is transmitted from said communication unit to said relay apparatus, said relay apparatus retransmitting said content data to said reception apparatuses.

14. The transmission control method according to claim 11, wherein said quality information transmission request is transmitted from said communication unit to said relay apparatus, said relay apparatus retransmitting said quality information transmission request to said reception apparatuses.

15. The transmission control method according to claim 11, wherein said communication unit is configured to receive said transmission quality information from said relay apparatus, said relay apparatus receiving said transmission quality information from reception apparatuses.

* * * * *